(12) United States Patent
Lapujade et al.

(10) Patent No.: US 9,718,560 B2
(45) Date of Patent: Aug. 1, 2017

(54) EXTERIOR AIRCRAFT LIGHT UNIT AND AIRCRAFT COMPRISING THE EXTERIOR AIRCRAFT LIGHT UNIT

(71) Applicant: Goodrich Lighting Systems GmbH, Lippstadt (DE)

(72) Inventors: Philippe G. Lapujade, Chandler, AZ (US); Andre Hessling Von Heimendahl, Koblenz (DE); Christian Schoen, Mainz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 9 days.

(21) Appl. No.: 14/458,483

(22) Filed: Aug. 13, 2014

(65) Prior Publication Data

US 2015/0078018 A1    Mar. 19, 2015

(30) Foreign Application Priority Data

Aug. 13, 2013 (EP) .................................. 13180258

(51) Int. Cl.
 *F21S 8/10* (2006.01)
 *B64D 47/04* (2006.01)
 (Continued)

(52) U.S. Cl.
 CPC ............ *B64D 47/04* (2013.01); *B64D 47/02* (2013.01); *B64D 47/06* (2013.01);
 (Continued)

(58) Field of Classification Search
 CPC ... B64D 47/04; B64D 2203/00; F21S 48/1154
 (Continued)

(56) References Cited

U.S. PATENT DOCUMENTS

2003/0086251 A1   5/2003  Hamilton et al.
2004/0114366 A1*  6/2004  Smith ................... F21S 48/328
                                                                362/247

(Continued)

FOREIGN PATENT DOCUMENTS

CA          2466518 A1    5/2003
DE     102009008418 A1    8/2010
                  (Continued)

OTHER PUBLICATIONS

European Search Report for Application No. 13180258.9-1754 Mailed Jan. 29, 2014. 6 Pages.

*Primary Examiner* — Donald Raleigh
*Assistant Examiner* — Christopher Raabe
(74) *Attorney, Agent, or Firm* — Cantor Colburn LLP

(57) ABSTRACT

An exterior aircraft light unit for emitting light of a first wavelength and light of a second wavelength, different from the first wavelength is disclosed. The exterior aircraft light unit has an integrated optical structure, which in turn has a first light source configured to emit the light of the first wavelength, a second light source configured to emit the light of the second wavelength, the second light source being positioned adjacent to the first light source, and an optical element for shaping a light emission distribution of the integrated optical structure. The optical element is arranged with respect to the first light source and the second light source in such a way that it affects both the light of the first wavelength and the light of the second wavelength.

19 Claims, 4 Drawing Sheets

(51) Int. Cl.
  *B64D 47/02* (2006.01)
  *B64D 47/06* (2006.01)
  *F21W 101/06* (2006.01)

(52) U.S. Cl.
  CPC ....... *F21S 48/1104* (2013.01); *F21S 48/1136* (2013.01); *F21S 48/1154* (2013.01); *B64D 2203/00* (2013.01); *F21S 48/137* (2013.01); *F21W 2101/06* (2013.01)

(58) Field of Classification Search
  USPC .......................................................... 362/470
  See application file for complete search history.

(56) References Cited

U.S. PATENT DOCUMENTS

| | | | |
|---|---|---|---|
| 2004/0240219 A1* | 12/2004 | Oishi et al. | 362/487 |
| 2006/0007012 A1 | 1/2006 | Machi et al. | |
| 2007/0211486 A1* | 9/2007 | Bernard | F21S 48/1159 362/509 |
| 2009/0196060 A1* | 8/2009 | Sazuka et al. | 362/509 |
| 2010/0102199 A1* | 4/2010 | Negley | F21V 7/0008 250/201.1 |

FOREIGN PATENT DOCUMENTS

| | | | |
|---|---|---|---|
| EP | 1152921 | A2 | 11/2001 |
| EP | 1168902 | A2 | 1/2002 |
| EP | 2157017 | A2 | 2/2010 |
| EP | 2604521 | A1 | 6/2013 |
| WO | 0049331 | A2 | 8/2000 |
| WO | 03039957 | A1 | 5/2003 |

\* cited by examiner

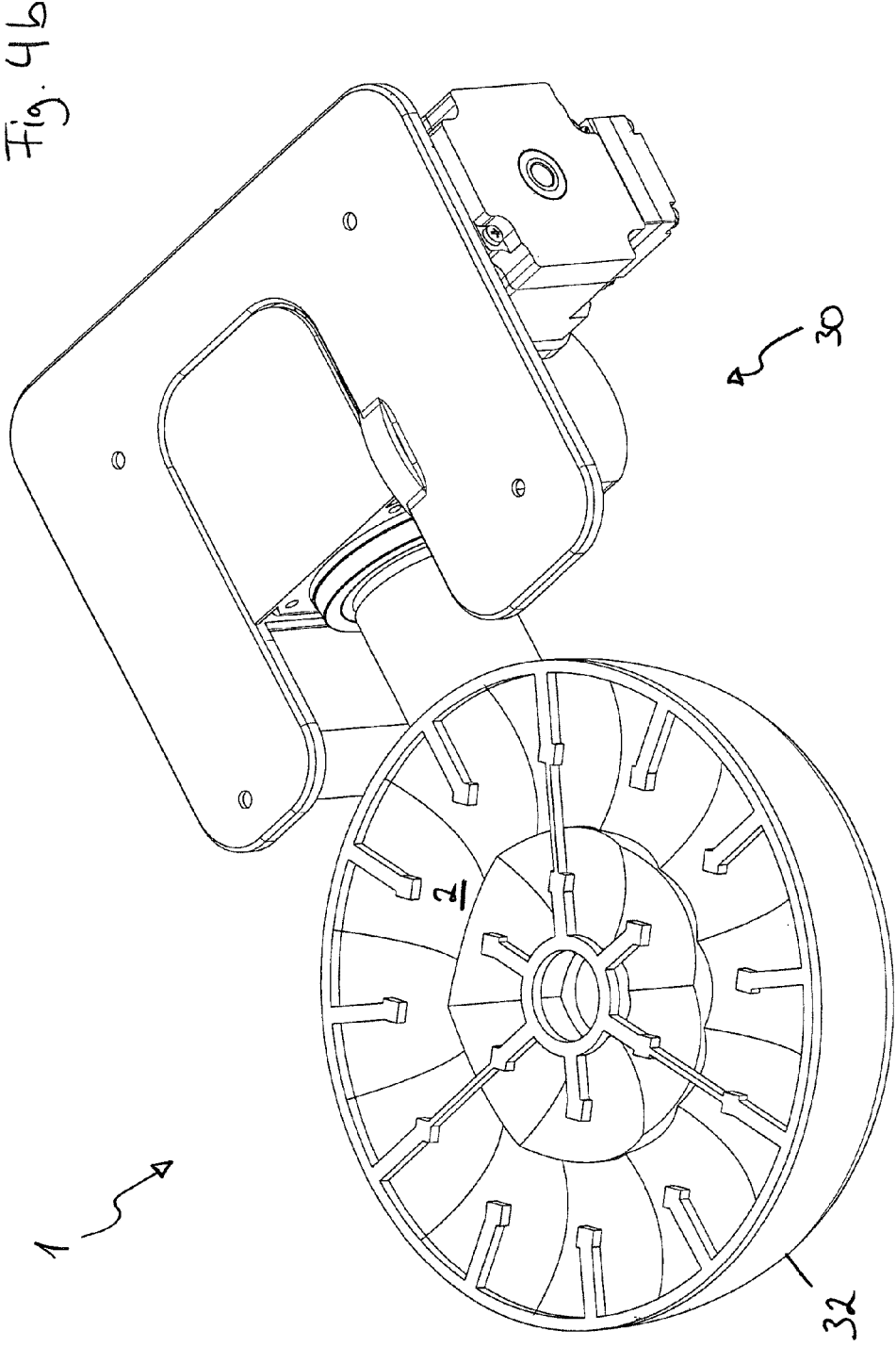

EXTERIOR AIRCRAFT LIGHT UNIT AND AIRCRAFT COMPRISING THE EXTERIOR AIRCRAFT LIGHT UNIT

CROSS REFERENCE TO RELATED APPLICATIONS

This application claims priority to European Patent Application No. 13 180 258.9 filed Aug. 13, 2013, the entire contents of which is incorporated herein by reference.

FIELD OF TECHNOLOGY

The invention relates to lighting systems of aircraft. In particular, it relates to exterior aircraft light units, such as for example used in helicopters and air planes. More in particular, it relates to exterior aircraft light units that are capable of emitting light of different wavelengths.

BACKGROUND

Exterior aircraft light units are provided for a variety of purposes, such as for illumination, for signalling purposes, and for assessing the environment, for example in the course of landing and/or taxiing operations and/or search manoeuvres. Light units are known that emit light of different wavelengths. For example, it is known to provide search and landing lights that are capable of emitting visible light on the one hand and infrared light on the other hand. Other applications also call for two or more lighting modes with the emission of light of different wavelengths, due to particular application requirements and/or due to regulatory requirements. In known light units, a first light source with a first wavelength is provided with one or more optical elements for shaping the emission characteristics of the light of the first wavelength. A second light source with a second wavelength is provided with one or more optical elements for shaping the emission characteristics of the light of the second wavelength. The space requirements of such a light unit have been found to not be satisfactory.

Accordingly, it would be beneficial to provide an exterior aircraft light unit that has reduced space requirements. Further, it would be beneficial to provide an aircraft having such an exterior aircraft light unit.

SUMMARY

Exemplary embodiments of the invention include an exterior aircraft light unit for emitting light of a first wavelength and light of a second wavelength, different from the first wavelength, with the exterior aircraft light unit comprising an integrated optical structure. The integrated optical structure comprises a first light source configured to emit the light of the first wavelength, a second light source configured to emit the light of the second wavelength, the second light source being positioned adjacent to the first light source, and an optical element for shaping a light emission distribution of the integrated optical structure, wherein the optical element is arranged with respect to the first light source and the second light source in such a way that it affects both the light of the first wavelength and the light of the second wavelength.

The term first wavelength may refer to one particular wavelength or to a set wavelength range. Equally, the term second wavelength may refer to one particular wavelength or to a set wavelength range. In other words, the first and second light source(s) do not have to be single wavelength light sources. It is possible that one or both of the first and second light source(s) emit radiation of frequency ranges. The first wavelength being different from the second wavelength therefore means that no wavelengths emitted by the first light source(s) are emitted by the second light source(s) and vice versa, at least not to a significant extent.

By way of the invention, a high integration of the light unit is achieved. The same optical element shapes both the light of the first wavelength, emitted by the first light source, as well as the light of the second wavelength, emitted by the second light source. In other words, the same optical element is in the light path of both the first light source and the second light source. It may therefore shape the output emission characteristics of the light of both wavelengths. As compared to the prior art, where the first light source and the second light source are disposed in separate sub-structures, the present invention teaches to provide one integrated optical structure for both light sources. The need of the prior art for separate, usually adjacent sub-structures for the light of different wavelengths is eliminated. As compared to the prior art, where the light paths of the first light source and the second light source merge outside of the light unit, the light paths of the first and second light sources of the present invention merge within the integrated optical structure and "upstream" of the optical element. In this way, the space requirements of exterior aircraft light units may be reduced by ca. 50%.

The expression "affecting both the light of the first wavelength and the light of the second wavelength" means that the light emission distribution of both the first light source and the second light source is altered by the optical element. In other words, the optical element refracts or reflects both light of the first wavelength and light of the second wavelength. It may affect a portion of the light emitted from the first and second light sources or may affect substantially the entire light emitted from the first and second light sources. The optical element has a significant influence on the light emission distribution of the light unit and is therefore qualitatively different from structures with low optical effect, such as for example a generally transparent light unit housing.

By providing the first light source and the second light source adjacent to each other, it is made possible that their emitted light is affected in a similar manner by the optical element. In other words, the optical element has a similar effect on the light coming from the first light source and from the second light source. In yet other words, the incident angle of the light of the first wavelength only deviates slightly from the incident angle of the light of the second wavelength. For this purpose, the distance between the center points of the first and second light sources may be less than 30%, preferably less than 20%, and more preferably less than 10% of the distance between the light sources and the optical element. In a particular embodiment, the first and second light sources may be immediately adjacent to each other. In other words, the first and second light sources may be placed as close to each other as is technically possible, taking into account their lateral extensions, electrical terminals, cooling requirements, etc.

According to a further embodiment, the first wavelength is in the visible range and the second wavelength is in the infrared range. In this way, the exterior aircraft light unit may be used for illumination with visible light on the one hand and for "illumination" with infrared light on the other hand. Emission of infrared light may be desired in situations where the aircraft's exterior lights are not supposed to be seen with the human eye or where infrared light is reflected better by the environment or for other reasons. It is explicitly pointed out, however, that the first and the second wavelengths may also be different wavelengths in other light ranges. For example, it is possible that both the first wavelength and the second wavelength are in the visible light range, but comprise different colors.

Both the first light source and the second light source may have particular light emission distributions. In a particular embodiment, both the first light source and the second light source may be directed light sources, meaning that they have a principal light emission direction, i.e. a light emission direction of greatest relative light intensity. In particular, the first light source may have a first principal light emission direction and the second light source may have a second principal light emission direction.

According to a further embodiment, the first light source is an LED and the second light source is a solid state infrared emitter. It is also possible that both the first light source and the second light source are LED's. It is also possible that both the first light source and the second light source are solid state infrared emitters. In particular, it is possible that the first light source is a white LED. It is also possible that the second light source is an infrared LED. By providing LED's and/or solid state infrared emitters, high illumination for low electric power is provided. Moreover, those devices themselves do not require much space.

According to a further embodiment, a principal light emission direction of the first light source is parallel to a principal light emission direction of the second light source. In other words, the first and second light sources are both directed light sources and are arranged adjacent to each other in such a way that their principal light emission directions point into the same direction (when seen from afar). In this way, the light from the first light source and the light from the second light source hit the optical element in a very similar manner. In particular, the light distribution from the second light source is merely offset with respect to the light distribution from the first light source by the distance between the two light sources.

According to a further embodiment, the optical element is a lens. In this way, the lens may transform the light emission distribution of both the first light source and the second light source. With a lens as the optical element, various transformations of the light intensity distributions may be achieved in a simple manner. In a particular embodiment, the lens may substantially collimate the light from one of the first and second light sources. The collimated beam may have a first output direction. At the same time, the lens may nearly collimate the light from the other one of the first and second light sources, i.e. provide a light beam with a small opening angle, whose principal emission direction deviates only slightly from the first output direction.

According to a further embodiment, the principal light emission directions of the first light source and the second light source are perpendicular to the plane of extension of the lens. In this way, the light of the first wavelength and the light of the second wavelength both hit the lens in a well-defined manner, which allows for an efficient refraction of the light over a wide area. It is also possible that the principal light emission direction of one of the first light source and the second light source is perpendicular to the plane of extension of the lens, while the principal light emission direction of the other one of the first and second light source hits the plane of extension of the lens at an angle other than 90°. This angle may account for the different refractions of the light from the two light sources.

According to a particular embodiment, one of the principal light emission directions of the first light source and the second light source runs through the center of the lens. By hitting the lens at the center and at a right angle, a particularly well-defined refraction may be achieved.

According to a further embodiment, the optical element is a reflector. A reflector is another suitable element that allows for various transformations of the light intensity distributions of the first and second light sources. According to a particular embodiment, the reflector may allow for a reversal of the principal light emission directions of the first and second light sources. Such reversal may be a substantially 180° reversal for one of the two light sources and a non-perfect reversal, i.e. a change in direction of between 160° and 200°, more preferably of between 170° and 190°, for the other one of the two light sources. In this way, the reflector may lead to an even greater integration of the optical structure. The first and second light sources may be placed in the output light path, i.e. they may be in the field of the reflected light.

According to a particular embodiment, the reflector is a substantially parabolic reflector. In this way, the light from one of the two light sources may be transformed into a collimated beam. The light from the other one of the two light sources may be transformed into a beam with a very small opening angle, whose principal light emission directions only deviates slightly from the collimated beam. The term "substantially parabolic" takes into account the practical difficulties of producing a perfectly parabolic reflector. Accordingly, the reflector may be near-parabolic. In an alternative embodiment, the reflector may be spherical or may consist of several spherical portions. Such structures are also suitable choices for achieving desired transformations of the light intensity distributions, in particular for achieving near-collimated beams. However, they pose fewer problems during the production. It is pointed out that the reflector may lead to other desired light output characteristics apart from a collimated beam as well.

According to a particular embodiment, one of the principal light emission directions of the first light source and the second light source runs through the vertex of the parabolic reflector. This positioning and directing of the light source allows for a particularly good collimation. For the case of the spherical reflector or the reflector comprising several spherical portions, the principal light emission direction of one of the first and second light sources may run through the center of the spherical reflector surface or through the center of the center-most portion of the several spherical portions.

According to a further embodiment, the integrated optical structure comprises a plurality of optical elements, with each of the optical elements being arranged with respect to the first light source and the second light source in such a way that it affects both the light of the first wavelength and the light of the second wavelength. In this way, the transformation of the light intensity distribution from the inherent distributions of the first and second light sources to the emission distribution of the light unit is split up between multiple elements. However, each of the optical elements is in the path of at least some light from the first light source as well as from the second light source. Accordingly, the plurality of optical elements is fully integrated into the integrated optical structure.

According to a particular embodiment, each of the optical elements affects a respective portion of the light of the first wavelength and the light of the second wavelength. In other words, the path of any given light ray of the first and second light sources is affected by exactly one of the optical elements. Accordingly, the optical elements are arranged "side by side" in an optical sense, i.e. they cover different portions of the light emission distributions of the first and second light sources. It is pointed out, however, that it is also possible that the plurality of optical elements may be stacked, i.e. that the paths of at least some of the light rays of the first and second light sources run through multiple optical elements one after the other.

According to a particular embodiment, the plurality of optical elements comprises a lens and a reflector, with the reflector being arranged around the lens. In this way, an embodiment is provided where a portion of the emitted light is transformed by the lens, while another portion of the emitted light is transformed by the reflector. In particular, the lens may transform that portion of the emitted light that contains the principal light emission directions of the first and second light sources.

According to a further embodiment, the exterior aircraft light unit comprises a plurality of integrated optical structures, with each integrated optical structure comprising a respective first light source configured to emit light of the first wavelength, a respective second light source configured to emit light of the second wavelength, the respective second light source being positioned adjacent to the respective first light source, and a respective optical element for shaping a light emission distribution of the respective integrated optical structure, wherein the respective optical element is arranged with respect to the respective first light source and the respective second light source in such a way that it affects both the light of the first wavelength and the light of the second wavelength. In other words, in each of the integrated optical structures, the respective optical element shapes the light emission of that integrated optical structure. The respective optical element shapes both the emission of the light of the first wavelength, coming from the respective first light source, as well as the emission of the light of the second wavelength, coming from the respective second light source. In this way, an array of optical structures is formed, with each of these structures being fully integrated. Each of the optical structures emits light of the first wavelength and light of the second wavelength. The overall light emission is provided by multiple light cells. The light emissions of the optical structures add up for the overall light emission of the exterior aircraft light unit.

According to a particular embodiment, the plurality of integrated optical structures have corresponding light emission directions. In this way, the light emissions of the several integrated optical structures add up in a reinforcing manner. The overall illumination capacity is substantially the sum of the illumination capacities of the integrated optical structures. The expression "corresponding light emission directions" accounts for slight deviations in the light intensity distributions between the plurality of integrated optical structures. These slight deviations may exist with respect to individual characteristics, such as the principal light emission direction, or with respect to the light intensity distribution as a whole. The deviations may be due to manufacturing tolerances or may be provided on purpose. For example, the desired opening angle of the light beam of a particular wavelength may be somewhat broader for the light unit as a whole as compared to the opening angle of the individual integrated optical structures. By arranging the integrated optical structures in a suitable manner, such a broader opening angle may be achieved. In another example, the arrangement of the individual integrated optical structures may take into account the deviations in the light intensity distributions between the light of the first wavelength and the light of the second wavelength in the individual optical structures.

According to a further embodiment, the integrated optical structure may have additional light sources that are not affected by the optical element. In particular, these additional light sources may add to the overall light output of the integrated optical structure. In this way, more illumination capacity may be provided per integrated optical structure.

In general, it is pointed out that the position of the first light source and the second light source with respect to the optical element can be interchanged, depending on the requirements of the particular application. Wherever the position of the first light source is described within the integrated optical structure, this position may also be assumed by the second light source, with the first light source taking over the position of the second light source. In particular with respect to the first light source being a source of visible light and the second light source being a source of infrared light, their positioning is not intended to be limited by their numbering. They may be interchanged.

According to a further embodiment, the exterior aircraft light unit is adapted to be a fixed position or movable search, taxi and/or landing light. In any case, the exterior aircraft light unit requires little space and weight, while providing high illumination capacities from different light sources. This is aerodynamically beneficial both for fixed lights and movable lights. Since the light unit is small and light, the force for moving a movable light unit is reduced, resulting in smaller motors and gears and therefore in further weight savings.

According to a further embodiment, the integrated optical structure may have an extension of less than 10 cm, in particular less than 5 cm, in its principal light emission direction. The integrated optical structure may have an extension of less than 10 cm, in particular less than 5 cm in a plane orthogonal to the principal light emission direction. An exterior aircraft light unit that comprises a plurality of integrated optical structures positioned side by side, may have an extension of less than 15 cm, in particular less than 10 cm, in the principal light emission direction and an extension of less than 30 cm, in particular between 10 cm and 20 cm, in a plane orthogonal to the principal light emission direction.

BRIEF DESCRIPTION OF THE DRAWINGS

Exemplary embodiments of the invention further include an aircraft, such as an air plane or a helicopter, comprising at least one exterior aircraft light unit, as described in any of the embodiments above. Above modifications and advantages equally relate to the aircraft.

Embodiments of the invention are described in greater detail below with reference to the figures, wherein:

FIG. 4b shows the fourth exemplary embodiment of an exterior aircraft light unit in accordance with the invention in a perspective view, the fourth exemplary embodiment having multiple integrated optical structures.

DETAILED DESCRIPTION

Figure 1:
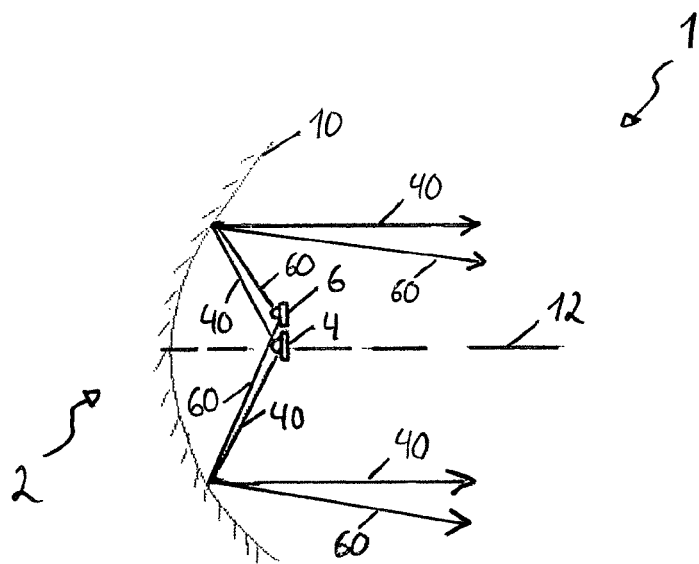
FIG. 1 shows a functional drawing of a first exemplary embodiment of an exterior aircraft light unit in accordance with the invention.

FIG. 1 shows a cross-section through an exterior aircraft light unit 1 in accordance with an exemplary embodiment of the invention. In particular, FIG. 1 shows only those elements of the light unit 1 that are relevant to the present invention. Other elements, such as a mounting plate and other mounting means, an at least partially transparent housing, power supply means and circuitry as well as control circuitry, are omitted from FIG. 1 and most of the other figures for a clearer illustration of the invention.

The exterior aircraft light unit 1 comprises an integrated optical structure 2. This integrated optical structure 2 in turn comprises a first light source 4, a second light source 6 and a reflector 10. The first light source 4 is an LED, which emits visible light of a first wavelength. In particular, it emits light of a first wavelength range, more in particular white light. The second light source 6 is a solid state infrared emitter, emitting infrared light of a second wavelength, which may also be a second wavelength range.

The reflector 10 is a parabolic reflector. It has the shape of a parabolic curve in the cross-section of FIG. 1. However, it is a rotationally symmetric three-dimensional structure. The axis of rotational symmetry is also referred to as the central axis 12 of the reflector 10. This central axis 12 extends through the vertex of the parabolic reflector 10.

Both of the first light source 4 and the second light source 6 are directed light sources, i. e. they have a principal light emission direction. For both of the first and second light sources 4, 6, the principal light emission direction is towards the parabolic reflector 10. In other words, both the first light source 4 and the second light source 6 are oriented towards the parabolic reflector 10.

The light emission direction of the exterior aircraft light unit 1 is substantially towards the right in the drawing plane of FIG. 1. The principal light emission directions of the first and second light sources 4, 6 are towards the left in the drawing plane of FIG. 1. Accordingly, the parabolic reflector 10 substantially reverses the light emission direction of the first and second light sources 4, 6.

The first light source 4 is placed on the central axis 12 of the reflector 10. It is further placed in the focal point of the reflector 10. Accordingly, the light emitted from the first light source 4 is transformed into a collimated beam by the reflector 10. This is illustrated by two exemplary light rays 40, which leave the first light source 4, are reflected by the reflector 10, and are at that time re-directed straight towards the right in the drawing plane of FIG. 1.

The second light source 6 is placed adjacent to the first light source 4. Due to this adjacent placement, the second light source 6 is offset from the focal point of the reflector 10 and from the central axis 12 of the reflector 10. Being out of the focal point of the reflector 10, the light emitted from the second light source 6 is not transformed into a collimated beam. Instead, the reflector 10 transforms the light from the second light source 6 into a beam with a small opening angle and with a principal light emission direction that is somewhat angled with respect to the collimated beam of the first light source 4. This is illustrated by two light rays 60 of the second light source. The two light rays 60 hit the parabolic reflector 10 at the same spots where the two exemplary light rays 40 of the first light source 4 hit the parabolic reflector 10. Upon leaving the parabolic reflector 10, the two light rays 60 are angled to the bottom in the drawing plane of FIG. 1, as compared to the respective light rays 40. Also, the two light rays 60 may not be entirely parallel. This illustrates that the light of the second wavelength, emitted from the second light source 6, is transformed into a not entirely collimated beam, whose principal light emission direction is not exactly to the right in the drawing plane of FIG. 1. However, the two light rays 60 may also be parallel, depending on the location of the second light source 6 with respect to the focal plane of the reflector 10.

It is explicitly pointed out that it is also possible in the embodiment of FIG. 1 and all other embodiments that neither light source is placed on the central axis 12 of the reflector 10. Both light sources may be offset from the central axis 12. In particular, it is possible that both light sources are on opposite sides of the central axis 12. Further, both light sources may have the same distance to the central axis 12.

Despite these variations in the output characteristics of the light of the first wavelength 40 and the light of the second wavelength 60, the adjacent placing and close proximity of the first and second light sources 4, 6 ensures that the light of the first wavelength 40 and the light of the second wavelength 60 is effected by the reflector 10 in a very similar manner, resulting in similar output characteristics. In particular, the adjacent placing of the first and second light sources 4, 6 allows for a small angle between the principal output emission direction of the light of the first wavelength 40 and the principal output emission direction of the light of the second wavelength 60. Also, the opening angle of the beam of the light of the second wavelength 60 is not much bigger than the opening angle of the light of the first wavelength 40 (which is zero in the ideal example of a perfectly parabolic reflector 10).

Figure 2:
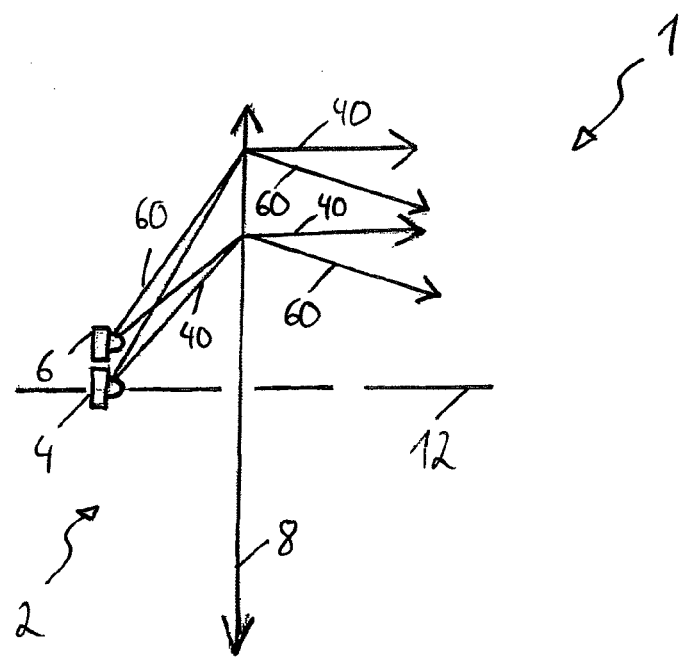
FIG. 2 shows a functional drawing of a second exemplary embodiment of an exterior aircraft light unit in accordance with the invention.

FIG. 2 shows a cross-section through an exterior aircraft light unit 1 in accordance with another exemplary embodiment of the invention. Again, the light unit 1 comprises an integrated optical structure 2. The integrated optical structure 2 again comprises a first light source 4 and a second light source 6. Instead of a reflector, however, the integrated optical structure 2 comprises a lens 8.

The lens 8 is illustrated by a line with two arrows. Despite being illustrated as a line in a simplified manner, the lens 8 has at least one curved surface. In particular, both surfaces may be curved. It is also possible that one surface is curved, while the other surface is plane. In the exemplary embodiment of FIG. 2, the lens 8 is a converging lens that converges the light emitted from the first and second light sources 4, 6. In the exemplary embodiment of FIG. 2, the lens 8 is biconvex or plano-convex. The lens 8 is a three-dimensional structure, whose plane of extension is perpendicular to the drawing plane and runs through the line indicating the lens 8 in the drawing of FIG. 2. In the exemplary embodiment of FIG. 2, the lens 8 is a substantially round lens. This round lens 8 has a central axis 12.

Again, the first light source 4 is placed on the central axis 12 of the lens 8. It is further placed in the focal point of the lens 8. Accordingly, the light emitted by the first light source 4 is transformed into a collimated beam by the lens 8. This is again illustrated by two exemplary light rays 40 that are refracted by the lens 8 to become parallel.

Again, the second light source 6 is placed adjacent to the first light source 4. It is therefore again offset from the focal point of the lens 8. Consequently, the light emitted from the second light source 6 is not transformed into a collimated beam by the lens 8. The refraction of the light from the second light source 6 is illustrated with respect to two exemplary light rays 60. The two exemplary light rays 60 hit the lens 8 at the same points where the two exemplary light rays 40 from the first light source 4 hit the lens 8. Due to their different incident angle, the light rays 60 are refracted differently and leave the lens 8 at an angle with respect to the light rays 40, when leaving the lens 8. In the exemplary embodiment of FIG. 2, the light rays 60, when leaving the lens 8, are angled towards the bottom in the drawing plane of FIG. 2. This again demonstrates that the principal output emission direction of the light of the second wavelength 60 is angled with respect to the principal output emission direction of the light of the first wavelength 40. Also, the light of the second wavelength 60 constitutes a beam with a small opening angle.

It is pointed out again that it is also possible that neither light source is placed on the central axis 12 of the lens 8. Both light sources may be offset from the central axis 12. In particular, it is possible that both light sources are on opposite sides of the central axis 12. Further, both light sources may have the same distance to the central axis 12.

As compared to the exemplary embodiment of FIG. 1, comprising a reflector, the first and second light sources 4 and 6 are arranged in such a way that their principal light emission directions are towards the right in the drawing plane of FIG. 2. Accordingly, the principal light emission direction of the light of the first wavelength and the light of the second wavelength is not or only slightly altered by the lens 8.

Figure 3:
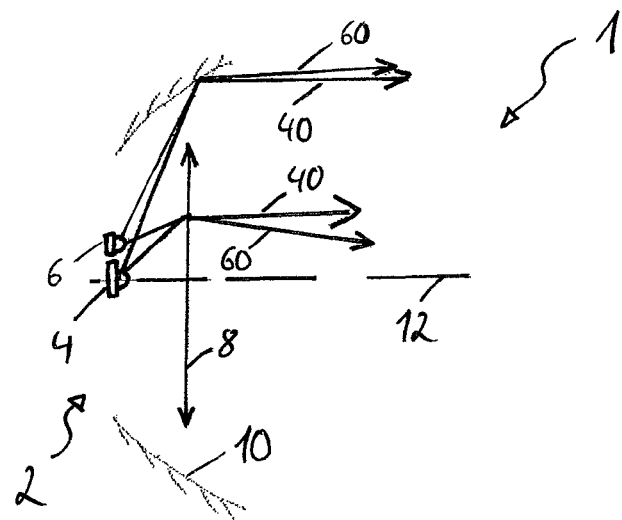
FIG. 3 shows a functional drawing of a third exemplary embodiment of an exterior aircraft light unit in accordance with the invention.

FIG. 3 shows a cross-section through an exterior aircraft light unit 1 in accordance with another exemplary embodiment of the invention. The exterior aircraft light unit 1 again has an integrated optical structure 2. This integrated optical structure 2 is designed similar to the integrated optical structure 2 of the exemplary embodiment of FIG. 2. In particular, it also comprises a first light source 4, a second light source 6 and a lens 8, which are arranged with respect to each other in the same manner as in the exemplary embodiment of FIG. 2. However, the lens 8 of FIG. 3 has a smaller extension than the lens 8 of FIG. 2 in its plane of extension, as defined above. Accordingly, it affects a smaller portion of the light emitted from the first and second light sources 4, 6.

In order to transform the remainder of the light emitted from the first and second light sources 4, 6, a parabolic reflector 10 is provided in the integrated optical structure 2. The parabolic reflector 10 is a portion of a paraboloid. In particular, it is a slice of a paraboloid, the slice having no vertex, but having a generally annular shape. The parabolic reflector 10 has an axis of rotational symmetry, which coincides with the central axis 12 of the lens 8. The reflector 10 is arranged around the lens 8. In this way, the light leaving the first and second light sources 4, 6 and not hitting the lens 8 is reflected by the reflector 10. The reflector 10 is shaped in such a way that it collimates the light emitted from the first light source 4. In this way, the lens 8 and the reflector 10 jointly provide a collimated beam of first wavelength for leaving the exterior aircraft light unit 1. This collimated beam is illustrated by two exemplary light rays 40 of the first wavelength.

As the second light source 6 is adjacent to the first light source 4, the light of the second wavelength is reflected somewhat differently by the reflector 10. Accordingly, the light of the second wavelength 60 is reflected by the lens 8 in combination with the reflector 10 into a beam with a small opening angle and with a principal output emission direction that is similar to that of the light of the first wavelength 40.

Figure 4A:
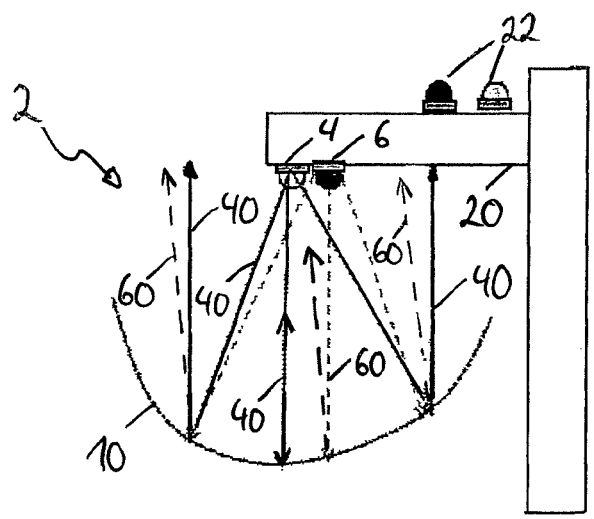
FIG. 4a shows a functional drawing of an integrated optical structure to be used in a fourth exemplary embodiment of an exterior aircraft light unit in accordance with the invention.

FIG. 4a shows a cross-section through an integrated optical structure 2 to be used in an exterior aircraft light unit 2 in accordance with another exemplary embodiment of the invention. The integrated optical structure 2 is very similar to the integrated optical structure 2 shown in FIG. 1. The working principle of the first light source 4, the second light source 6, and the parabolic reflector 10 is therefore not repeated. However, the integrated optical structure 2 of FIG. 4a is different from the integrated optical structure 2 of FIG. 1 in two aspects.

First, FIG. 4a shows a mounting arm 20 which was omitted from FIG. 1 for a clearer illustration. The mounting arm 20 supports the first and second light sources 4, 6. In particular, the first and second light sources 4, 6 are mounted to the bottom side of the mounting arm 20 in the drawing plane of FIG. 4a. In this way, the first and second light sources 4, 6 are held in place with respect to the reflector 10.

Second, the integrated optical structure 2 further comprises additional light sources 22. These additional light sources 22 are provided on an upper side of the mounting arm 20. They have their principal light emission direction towards the top in the drawing plane of FIG. 4a. As the light from the first and second light sources 4, 6 is reflected by the reflector 10 towards the top of the drawing plane of FIG. 4a, the additional light sources 22 reinforce the light emission towards the top, which is the principal output emission direction of the integrated optical structure 2. In the present exemplary embodiment, the additional light sources 22 comprise an LED, emitting visible light, in particular white light, as well as a solid state infrared emitter. In this way, the additional light sources 22 contribute to the emission of both light of the first wavelength and light of the second wavelength.

It is pointed out that the additional light sources 22 are entirely optional elements that can be dispensed with. Their provision depends on the particular application for the integrated optical structure 2. It is also possible to provide a different number of additional light sources. For example, it is possible to provide one or more light sources of one of the first and second wavelengths only. It is also possible to provide multiple light sources of each of the first and second wavelengths.

FIG. 4b shows a perspective view of an exemplary exterior aircraft light unit 1 in accordance with another exemplary embodiments of the invention, the light unit 1 having a plurality of integrated optical structures 2 substantially as shown in FIG. 4a. In particular, the exterior aircraft light unit 1 has 18 integrated optical structures 2.

Each of these 18 integrated optical structures 2 has a mounting arm and a reflector. Each mounting arm carries a respective first light source and a respective second light source, directed towards the respective reflector. The first and second light sources cannot be seen in FIG. 4b due to the perspective viewing direction of FIG. 4b. None of the integrated optical structures 2 of FIG. 4b carries additional light sources on the upper sides of the mounting arms.

As can be seen, the 18 integrated optical structures 2 form cells of the light unit 1. The light emissions of these cells are reinforcing, resulting in an added light emission by the light unit 1, substantially corresponding to the sum of the 18 individual light emissions from the integrated optical structures 2.

The integrated optical structures 2 are contained in a housing 32. This housing 32 is attached to a mounting structure 30, which comprises a mounting arm for connecting the housing 32 to the remainder of the mounting structure 30. The housing may be moved via the mounting arm with the help of one or more motors, contained in the mounting structure 30. In particular, the motors may allow for both a tilting as well as a rotating of the housing and, therefore, of the integrated optical structures 2. In this way, the light unit 1 may in particular be used as a movable search and/or landing and/or taxi light.

Figure 4C:
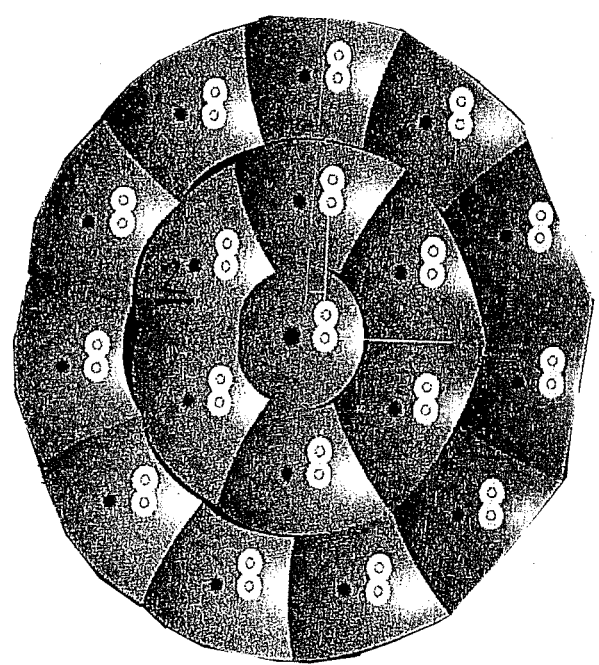
FIG. 4c shows a light source distribution of the exterior aircraft light unit of FIG. 4b in a top view.

FIG. 4c shows a schematic diagram of the arrangement of the light sources across the light head of the light unit 1 of FIG. 4b. It can be seen that each of the 18 integrated optical structures comprises a respective first light source and a respective second light source. Accordingly, the light intensity of the light unit 1 is doubled as compared to previous approaches where each cell of the light unit was used either for a light source of the first wavelength or a light source of the second wavelength. In other words, the space requirements may be halved for a given required light intensity.

It is pointed out that all of the optical elements described above as being parabolic may also have different shapes. Their shapes depend on the desired emission characteristics of the light unit. For example, instead of being parabolic, the optical elements may also be spherical or may consist of multiple spherical portions. Such structures are also suitable for effecting near-collimated beams. The described optical elements may have compound parabolic shapes, e.g. compound parabolic reflectors, or other free form profiles.

It is further pointed out that the embodiments of FIGS. 1-4 may have two operating modes, with the light of the first wavelength being emitted in the first operating mode and the light of the second wavelength being emitted in the second operating mode. It is also possible in all of the embodiments that the light unit emits the light of the first wavelength and the light of the second wavelength at the same time.

It is further pointed out that the Figs. are schematic only and not to scale. The drawings are intended to illustrate the working principles and are in particular not intended to be a correct representation of all input and output angles of the depicted light rays.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:

1. An aircraft comprising:
an exterior aircraft light unit for emitting light of a first wavelength and light of a second wavelength, different from the first wavelength,
wherein the exterior aircraft light unit is mounted to an exterior of the aircraft, and
wherein the exterior aircraft light unit comprises:
an integrated optical structure, comprising:
a first light source configured to emit the light of the first wavelength and having a first principal light emission direction,
a second light source configured to emit the light of the second wavelength and having a second principal light emission direction, the second light source being positioned adjacent to the first light source,
an optical element for shaping a light emission distribution of the integrated optical structure, wherein the optical element is arranged with respect to the first light source and the second light source in such a way that it affects both the light of the first wavelength and the light of the second wavelength, and
a mounting arm supporting the first light source and the second light source,
wherein the optical element is a substantially parabolic reflector, with the first and second light sources being directed towards the substantially parabolic reflector and the first and second principal light emission directions being substantially reversed by the substantially parabolic reflector and with one of the first principal light emission direction and the second principal light emission direction running through the vertex of the parabolic reflector.

2. The aircraft according to claim 1, wherein the first wavelength is in the visible range and the second wavelength is in the infrared range.

3. The aircraft according to claim 1, wherein the first light source is an LED and wherein the second light source is a solid state infrared emitter.

4. The aircraft according to claim 1, wherein the first principal light emission direction is parallel to the second principal light emission direction.

5. The aircraft according to claim 1, wherein the exterior aircraft light unit comprises a plurality of integrated optical structures, with each integrated optical structure comprising:
a respective first light source configured to emit light of the first wavelength,
a respective second light source configured to emit light of the second wavelength, the respective second light source being positioned adjacent to the respective first light source, and
a respective optical element for shaping a light emission distribution of the respective integrated optical structure, wherein the respective optical element is arranged with respect to the respective first light source and the respective second light source in such a way that it affects both the light of the first wavelength and the light of the second wavelength.

6. The aircraft according to claim 5, wherein the plurality of integrated optical structures have corresponding light emission directions.

7. The aircraft according to claim 1, wherein the exterior aircraft light unit is adapted to be a fixed position or movable search, taxi and/or landing light.

8. An aircraft comprising:
an exterior aircraft light unit for emitting light of a first wavelength and light of a second wavelength, different from the first wavelength,
wherein the exterior aircraft light unit is mounted to an exterior of the aircraft, and
wherein the exterior aircraft light unit comprises:
an integrated optical structure, comprising:
a first light source configured to emit the light of the first wavelength and having a first principal light emission direction,
a second light source configured to emit the light of the second wavelength and having a second principal light emission direction, the second light source being positioned adjacent to the first light source, and
an optical element for shaping a light emission distribution of the integrated optical structure, wherein the optical element is arranged with respect to the first light source and the second light source in such a way that it affects both the light of the first wavelength and the light of the second wavelength, wherein the optical element is a collimating lens, spaced from the first and second light sources, and wherein the first and second principal light emission directions are perpendicular to the plane of extension of the lens, with one of the first and second principal light emission directions running through the center of the lens.

9. The aircraft according to claim 8, wherein the first wavelength is in the visible range and the second wavelength is in the infrared range.

10. The aircraft according to claim 8, wherein the first light source is an LED and wherein the second light source is a solid state infrared emitter.

11. The aircraft according to claim 8, wherein the first principal light emission direction is parallel to the second principal light emission direction.

12. The aircraft according to claim 8, wherein the exterior aircraft light unit comprises a plurality of integrated optical structures, with each integrated optical structure comprising:
 a respective first light source configured to emit light of the first wavelength,
 a respective second light source configured to emit light of the second wavelength, the respective second light source being positioned adjacent to the respective first light source, and
 a respective optical element for shaping a light emission distribution of the respective integrated optical structure, wherein the respective optical element is arranged with respect to the respective first light source and the respective second light source in such a way that it affects both the light of the first wavelength and the light of the second wavelength.

13. The aircraft according to claim 8, wherein the exterior aircraft light unit is adapted to be a fixed position or movable search, taxi and/or landing light.

14. An aircraft comprising:
 an exterior aircraft light unit for emitting light of a first wavelength and light of a second wavelength, different from the first wavelength,
 wherein the exterior aircraft light unit is mounted to an exterior of the aircraft, and
 wherein the exterior aircraft light unit comprises:
  an integrated optical structure, comprising:
   a first light source configured to emit the light of the first wavelength and having a first principal light emission direction,
   a second light source configured to emit the light of the second wavelength and having a second principal light emission direction, the second light source being positioned adjacent to the first light source, and
   a plurality of optical elements for shaping a light emission distribution of the integrated optical structure, wherein each of the plurality of optical elements is arranged with respect to the first light source and the second light source in such a way that it affects both the light of the first wavelength and the light of the second wavelength,
  wherein the plurality of optical elements comprises a collimating lens, spaced from the first and second light sources, and a reflector, with the reflector being arranged around the lens, with the collimating lens and the reflector affecting different portions of the light of the first wavelength and the light of the second wavelength, with the collimating lens being arranged to transform a portion of light from the first and second light sources that contains the first and second principal light emission directions.

15. The aircraft according to claim 14, wherein the first wavelength is in the visible range and the second wavelength is in the infrared range.

16. The aircraft according to claim 14, wherein the first light source is an LED and wherein the second light source is a solid state infrared emitter.

17. The aircraft according to claim 14, wherein the first principal light emission direction is parallel to the second principal light emission direction.

18. The aircraft according to claim 14, wherein the exterior aircraft light unit comprises a plurality of integrated optical structures, with each integrated optical structure comprising:
 a respective first light source configured to emit light of the first wavelength,
 a respective second light source configured to emit light of the second wavelength, the respective second light source being positioned adjacent to the respective first light source, and
 respective pluralities of optical elements for shaping a light emission distribution of the respective integrated optical structure, wherein the respective pluralities of optical elements are arranged with respect to the respective first light source and the respective second light source in such a way that they affect both the light of the first wavelength and the light of the second wavelength.

19. The aircraft according to claim 14, wherein the exterior aircraft light unit is adapted to be a fixed position or movable search, taxi and/or landing light.

* * * * *